United States Patent
Agarwal et al.

(10) Patent No.: US 7,836,028 B1
(45) Date of Patent: *Nov. 16, 2010

(54) VERSIONED DATABASE SYSTEM WITH MULTI-PARENT VERSIONS

(75) Inventors: Sanjay Agarwal, Nashua, NH (US); Ramkrishna Chatterjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 745 days.

This patent is subject to a terminal disclaimer.

(21) Appl. No.: 10/205,084

(22) Filed: Jul. 25, 2002

(51) Int. Cl.
*G06F 17/30* (2006.01)

(52) U.S. Cl. .................... 707/695; 707/798

(58) Field of Classification Search ............ 707/203, 707/201, 200, 100, 204, 8, 103 R, 103 X, 707/103 Y, 103 Z, 10, 206, 3, 4, 102, 104.1, 707/694, 695, 625, 610, 638, 641, 795, 796, 707/798, 956; 717/120; 704/5, 7, 9, 10
See application file for complete search history.

(56) References Cited

U.S. PATENT DOCUMENTS

| | | | | |
|---|---|---|---|---|
| 5,504,879 A | | 4/1996 | Eisenberg et al. ......... 707/100 |
| 5,600,832 A | | 2/1997 | Eisenberg et al. ......... 707/203 |
| 5,649,200 A | * | 7/1997 | Leblang et al. ........... 717/122 |
| 5,659,735 A | * | 8/1997 | Parrish et al. ............. 707/10 |
| 5,890,166 A | | 3/1999 | Eisenberg et al. ......... 707/203 |
| 5,991,771 A | * | 11/1999 | Falls et al. ............... 707/202 |
| 6,415,299 B1 | | 7/2002 | Baisley et al. |
| 6,460,052 B1 | * | 10/2002 | Thomas et al. ........... 707/203 |
| 6,584,476 B1 | | 6/2003 | Chatterjee et al. |
| 7,028,057 B1 | * | 4/2006 | Vasudevan et al. ....... 707/203 |
| 2003/0158871 A1 | * | 8/2003 | Fomenko ................. 707/203 |

OTHER PUBLICATIONS

Park et al., Implementation of Checkout/Checkin Mechanism on Object-Oriented Database, Database and Expert Systems Applications, 1996. Proceedings., Seventh International Workshop on, Sep. 9-10, 1996, pp. 298-303.*
Al-Khudar et al., Dynamic Evolution and Consistency of Collaborative Configuration in Object-Oriented Databases, Technology of Object-Oriented Languages and Systems, 2001. TOOLS 39., 39th International Conf. on, Jul. 29-Aug. 2001, pp. 207-218.*

* cited by examiner

*Primary Examiner*—Greta L Robinson
(74) *Attorney, Agent, or Firm*—Gordon E. Nelson

(57) ABSTRACT

A versioned relational database system (VRDBS) in which versions of data contained in a relational database system are accessed by means of workspaces. Metadata in the VRDBS permits a workspace to have multiple parents. The multi-parented VRDBS performs operations including specifying that a workspace be made an additional parent of another workspace or that an additional parent be removed as a parent of the other workspace. The fact that a workspace may have multiple parents affects the manner in which merge and refresh operations are performed and the manner in which system-enforced constraints such as primary key constraints, unique key constraints, and referential integrity constraints are handled. The metadata for the VRDBMS includes a multi-parent graph for each workspace that has multiple parents. The multi-parent graph is used in the performance of the merge and refresh operations and in determining constraint violations.

49 Claims, 8 Drawing Sheets

Prior Art     Fig. 1 wm$ancestor_workspaces_table 303

| Workspace | anc_workspace | anc_version |
|---|---|---|
| .... | | |
| w5 | w4 | v4 |
| ..... | | | wm$workspaces_table 311

| Workspace | parent_workspace | .... | IsMP |
|---|---|---|---|
| .... | | | |
| w5 | w4 | ... | 1 |
| ..... | | | | wm$mp_leaf_workspace_table 319

| mp_leaf_workspace | parent_workspace |
|---|---|
| .... | |
| w5 | w4 |
| ..... | | wm$mp_graph_table 325

| mp_leaf_workspace | mp_graph_workspace | mp_graph_flag |
|---|---|---|
| .... | | |
| w5 | w2 | R (ROOT) |
| w5 | w3 | I (INTERMEDIATE) |
| w5 | w4 | I |
| w5 | w5 | L (LEAF) |
| .... | | |

MP graph 335

- 337: live v0 -> v1
- 339: v2 w2
- 341: v3 w3
- 343: v4 w4
- 345: v5 w5
- 347: v6 w6 wm$version_hierarchy_table 333

| version | parent_version | workspace |
|---|---|---|
| v0 | NULL | LIVE |
| v1 | v0 | LIVE |
| v2 | v1 | w2 |
| v3 | v2 | w3 |
| v4 | v2 | w4 |
| v5 | v3 | w5 |
| v6 | v5 | w6 |
| ... | .... | ..... |

FIG. 3

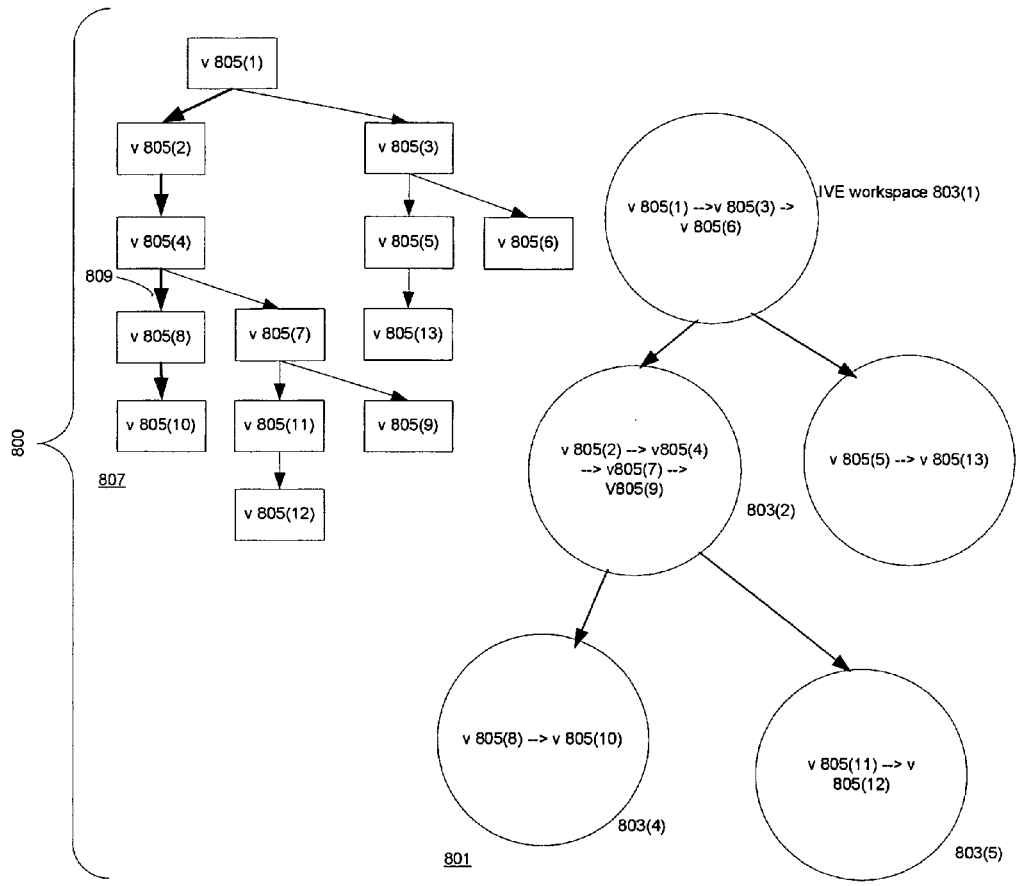

merge 803(4): changes made in v 805(10) in workspace 803(4) applied to v 805(9) in workspace 803(2).

refresh 803(4): changes made in v805(9) in workspace 803(2) applied to v 805(10) in workspace 803(4).

continual refresh: done automatically by VRDBS. Any change in the current version in LIVE workspace 803(1) is automatically applied to the current versions in descendant workspaces of LIVE in hierarchy 801 for which continual refresh has been specified.

FIG. 8  Prior Art

VERSIONED DATABASE SYSTEM WITH MULTI-PARENT VERSIONS

RELATED APPLICATIONS

The present patent application is closely related to Ramesh Vasudevan, Sanjay Agarwal, Ramkrishna Chatterjee, and Benjamin Speckhard, Versioned relational database system with an optimistic constraint model, filed on even date with the present patent application and having the same assignee.

BACKGROUND OF THE INVENTION

1. Field of the Invention

The invention relates to database systems generally and more particularly to versioned relational database systems.

2. Description of Related Art: FIGS. 1, 4, 5, and 8

Database systems are systems which store data and permit users of the systems to access items of the data by means of queries which describe the data in terms of the structure given the data by the database system. A common kind of database system is a relational database system. In such systems, the data is organized as a set of tables. A relational database table has a fixed number of columns and a variable number of rows. Each row has a field corresponding to each column, and the field contains a value. Queries on relational databases specify the data to be accessed in terms of the table or tables that contain it, columns in the table, and values of fields in some of the specified columns. For example, a simple table employees might look like this:

| emp_no | emp_name |
|--------|----------|
| 001    | Jones    |
| 002    | Smith    |
| 003    | Andrews  |
| 004    | Todd     |

The table has two columns, named emp_no, whose fields contain employee numbers, and emp_name, whose fields contain employee names, and four rows. A query that returned the name of the employee with the employee number "002" would look like this in the standard SQL language used with relational database systems:

SELECT emp_name FROM employees WHERE emp_no=002;

When the database system executes the query, it finds the row in the table employees whose field in the column emp_no has the value "002" and returns the value of the field in the row belonging to the column emp_name, or "Smith".

FIG. 1 shows the portions of a typical relational database system 101 that are relevant to the present discussion. The main components of system 101 are a processor, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109. Correspondingly, data 113 in memory 103 includes data for the application programs, data for the operating system, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects, which are objects, including tables, that database system 101 uses to manage and operate the database system, and user objects 129, which contain tables and other objects defined by users of the database system. In the present context, the only system objects which are important are those belonging to data dictionary 127, which contains definitions of all of the objects in the database system.

User tables include base tables 131, views 118, and materialized views 141. Base tables 131(*a* and *b*) are the tables that are the actual sources of the data returned by a query. Views are tables which do not exist in their own rights in persistent storage 123, but are instead created using data from other tables. Data dictionary 127 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and constraints, i.e. rules about the values that must be in the fields.

A view is defined in the data dictionary by a query on other tables. The other tables may also be views, but the data must ultimately come from base tables. View 118 contains four columns and three rows. The data in columns 1 and 2 comes from columns 1 and 2 of base table 131(*a*); the data in columns 3 and 4 comes from columns 3 and 4 of base table 131(*b*); the query that defines view 118 has selected the fields of columns 1 and 2 of rows 3-5 of table 131(*a*) and the fields of columns 3 and 4 of rows 2, 6, and 8 of table 131(*b*). When relational database system 101 executes a query on a view 118, it must first make the view, which requires running the query which defines the view; consequently, if the view is frequently queried, the view may be made into a materialized view 141, which is a copy of the view which has been stored in persistent storage 123. Data dictionary 127 keeps track of the fact that there is a materialized view 141 corresponding to view 118, and database system 101 redirects a query of view 118 to materialized view 141.

Versioned Database Systems: FIG. 4

A versioned database is one in which different versions of the database exist simultaneously. What users of the versioned database see is the different versions, rather than the underlying base tables. Versioned databases are typically used in research and development situations: when a new line of research which will affect an existing database begins, a new version of the database is associated with the line of work, and the results of the research are incorporated into the new version of the database. When the work is to the point where it can be incorporated into the existing database, the new version is merged into the existing database.

A commercially-available system for creating and managing versioned databases is Oracle Workspace Manager, a versioned relational database system (VRDBS), implemented in the Oracle 9i™ database system manufactured by Oracle Corporation and described in detail in the Oracle 9*i Application Developer's Guide-Workspace Manager*, Release 1 (9.0.1), Part Number A88806-01, available in March, 2002 at technet.oracle.com. This publication is incorporated by reference into the present patent application. FIG. 4 presents an overview of a versioned relational database system 401 and FIG. 5 presents relevant details of its implementation in the Oracle Workspace Manager. Shown in FIG. 4 is an example table, emp_table 403, which is a table of employee information. There is a row for each employee. The table has four columns: emp_id 404, which contains a unique identifier for each employee, name 405, whose fields contain the employees' names, salary 407, whose fields contain the employees' salaries, and address 409, whose fields contain the employees' addresses. The values of the emp_id fields are the primary keys for the table and must consequently obey a uniqueness constraint within the table. As will be explained in more detail in the following, metadata may be added to emp_table 403 to make it possible to maintain different versions of the table. A table to which such metadata has been added is termed a version-enabled table.

Workspaces and Versions

In the versioned relational database, the different versions of emp_table 403 are maintained simultaneously, with independent access to each of the versions. Access to a given version is by means of a workspace. A workspace has a number of functions in the preferred embodiment:

it is a virtual environment that one or more users can share to make changes to versions of a version-enabled table.
 it logically groups versions of one or more version-enabled tables, and isolates these versions until they are explicitly merged with production data or discarded, thus providing maximum concurrency; and
 the relationships between workspaces determine how changes can be propagated from one version to another.

Users can perform a variety of operations involving workspaces: go to navigates among workspaces; create, remove, and compress; refresh and merge propagate changes from a version in one workspace to a version in another workspace, and rollback returns to an earlier version in a workspace.

There are two types of workspaces: non-continual refresh (non CR) and continual refresh (CR). The non CR workspace has a frozen view of version-enabled table data; changes made in any of the parent workspace of the non CR workspace after the workspace was created will not be visible from the workspace. In contrast, the CR workspace has a continually updated view of the version-enabled tables. Any changes made in the parent workspace also will be instantly visible from the child.

When a table is version-enabled, the table as it exists at the time it is version-enabled is the first version. This first version exists in a single workspace, termed the LIVE workspace. The first version may be modified in the same way as the table prior to versioning.

A new version is established by a savepoint operation, which freezes the old version. The old version is made read only, and further modifications are made on the new version. The version in a workspace on which modifications may be made is termed the workspace's current version. A user of a workspace may explicitly specify a savepoint operation, and there is an implicit savepoint operation whenever a new workspace is created. A new workspace is always created as a child of an existing workspace, and the child workspace starts off with a newly created version that is a copy of the parent workspace's current version as of the time the child workspace is created; the implicit savepoint further creates a new version in the parent workspace, and that version is now the current version in the parent workspace. The current versions in the parent workspace and the child workspace may of course be modified independently. A given workspace may thus have a linear set of versions that are descendants of the version made when the workspace was created and any of the versions in the linear set may have descendants in workspaces that are descendants of the given workspace. The versioned database system includes metadata which keeps track of the hierarchy of versions in the system.

FIG. 8 at 800 shows how workspaces relate to each other, how versions relate to each other, and how workspaces and versions relate to each other. Workspace hierarchy 801 includes workspaces 803(1 . . . 5), which were created in the order in which they are numbered. Each workspace contains versions 805 of a version-enabled table; versions 805(1 . . . 13) are numbered in the order in which they were created in workspace hierarchy 801. At the moment shown in hierarchy 801, the current versions are 805(6), 805(9), 805(13), 805(10), and 805(12). Of course, a given workspace may include versions of a number of version-enabled tables. The version hierarchy for the versions is shown at 807. A branch of the version hierarchy is a path through the hierarchy from the root version to a single leaf version. One such branch 809 is shown by means of heavy arrows. The ancestors of a given version are the versions that are above it on the version's branch of the hierarchy. Thus, the ancestors of v 805(9) are v 805(7), v 805(4), v 805(2), and v 805(1). The descendants of a given version are all of the versions below the given version in all of the branches of the hierarchy that pass through the given version. Thus, all of the versions are descendants of v 805(1), while the descendants of v 805(3) are v 805(5)80, v 805(13), and v 805(6). There are similarly branches, ancestors, and descendants in the workspace hierarchy.

One application of a versioned relational database is doing "what if" exercises with different versions of the data in the database system. In FIG. 4, such an exercise is being performed on a version enabled table, emp_table 403. When emp_table 403 was version enabled, the result was LIVE workspace 410(0) containing live version 403(0) of emp_table 403. A user of the versioned relational database has made three new workspaces 410(1 . . . 3) containing versions 403 (1,3,5) of emp_table. When workspace 401(1) was made, it contained version 403(1) and version 403(2) was made the current version of workspace 410(0). Both version 403(1) and version 403(2) are copies of version 403(0). Similarly, when workspace 410(2) was made, it contained version 403(3) and the new current version of workspace 410(0) was version 403(4) and when workspace 410(3) was made, it contained version 403(5) and the new current version of workspace 410(0) was version 403(6). Live emp_table 403 (0,2,4) was not modified during creation of workspaces 410(1,2, and 3), so versions 403(0,2,4,6) are identical with each other, with version 403(6) being the current version in workspace 410(0). The version hierarchy for versions 403(0 . . . 6) of emp_table 403 is shown at 411.

Having made the new version, the user then modifies the new version in the version's workspace as required. In the example, current version 403(6) in live workspace 410(0) is a table of the current employees. One of the workspaces, 410 (1), contains a pessimistic version 403(1) for a business scenario in which times are hard and employees must be reduced to a minimum; one 410(2), a current level version 403(3), for a scenario in which the present business conditions continue and the number of employees needs a smaller reduction, and one 410(3), an optimistic version 403(5), for a scenario in which business improves and only a minimal reduction need be considered.

Workspace hierarchy 401 has at its top workspace 410(0) for live emp table versions 403(0,2,4,6). Current version 403 (6) is currently available to users other than the ones who are making the versions. At the next level are the three workspaces 410(1 . . . 3) for table versions 403(1,3,5). To make an additional workspace based on any workspace in the hierarchy, one simply goes to that workspace and makes the new workspace. The additional workspace is a child of the workspace in which it was made. Change propagation operations are available to propagate changes in a workspace's version up or down the workspace hierarchy to a version in another workspace. The version to which the change is propagated replaces rows which have changed less recently than the corresponding row in the version from which the change is propagated with the corresponding row in the latter version. Thus, if times are hard, workspace 410(1) may be merged with workspace 410(0). After the merger, the current live version 403(6) will have the most recently modified rows from pessimistic version 403(1) and live version 403(6).

Change Propagation Operations in the Workspace Hierarchy: FIG. 8

Operations in the VRDBMS which may result in propagation of changes from one table version to another are the following:
- when a data manipulation (DML) operation is performed on a record in a table version in a workspace. DML operations are always performed on the current version.
- when a DML operation performed on the current version of a table a workspace results in a continual refresh of the current versions of the table in descendants of the workspace that have been created with the continual refresh operation; thus, if workspaces 803(2) and 803(3) are continual refresh (CR) workspaces, continual refresh will apply any change made in current version 805(6) in LIVE workspace 803(1) to current version 805(9) in workspace 803(2) and to current version 805(13) in workspace 803(3).
- when a user performs a refresh operation on a workspace; refresh propagates the changes in the current version in a parent workspace relative to the current version in a child workspace to the current version in the child workspace; thus a refresh operation that specifies workspace 803(4) applies changes from current version 805(9) in workspace 803(2) to current version 805(10) in workspace 803(4).
- when a user performs a merge operation on a workspace; merge propagates the changes in the current version in a child workspace relative to the current version in the child's parent workspace to the current version in the parent workspace; thus a merge operation that specifies workspace 803(4) propagates changes from current version 805(10) to current version 805(9) in workspace 803(2).
- when a user performs a DDL operation that redefines a version-enabled table. Such an operation of course affects every version of the table.

Implementation of the Versions: FIG. 5

In the Oracle Workspace Manager, the table versions in the workspaces are implemented by displaying the results of queries on tables. The queried tables may be views or base tables. The tables contains not only the information that is of interest to the users of the versioned database, but additional columns for version information which the database system uses to generate the query results corresponding to each of the versions. FIG. 5 shows a redefinition 501 of emp_table 403, emp_table_LT 501, which contains version info columns 502 and additional rows of information 511(1 . . . 3). The information in the version information columns and in the additional rows permits the generation of results corresponding to tables 403(0,3, and 5) from table 501, as shown at 513, 521, and 523.

Continuing with version information columns 502, there are four such columns:
- version number 503: the value in a row's field in this column is the number of the version that the row with its present contents was created in.
- child version numbers 505: this field contains a list of numbers of descendant versions of the version specified at 503 where the row has been modified.
- deleted flag 507: this field indicates whether the row has been deleted in the version indicated in field 503; and
- lock flag 509: this field indicates whether the row is currently locked.

Changes are made in table 501 by users working in various workspaces. Changes may include modifications of values in fields of the table and addition or deletion of rows.

When a row is changed in a version of the table so that it is no longer identical with a row higher in the hierarchy, the new version of the row is added to table 501, with version number 503 set to indicate which version the added row was changed in. Child version field 505 of the row in the parent version that the changed row was formerly identical with is changed to indicate that the parent row is no longer contained in the child version. When a row that is present in a version at a higher level of the version hierarchy is included in a version at a lower level of the hierarchy, child versions 505 is updated in the row belonging to the higher-level version to indicate the fact that the row is included in the lower-level version.

In FIG. 5, live emp_table 403(0) has rows for six employees; these rows appear at 511(0) in emp_table_LT 501. The versions in workspaces 410(1-3) differ from the version in workspace 410(0) in that in the query results for each version, a greater or lesser number of rows are deleted from version 403(0). In pessimistic version 403(1), rows for three employees are deleted; in current level version 403(3), rows for two employees are deleted; in optimistic version 403(5), only 1 row is deleted. Delete flag 507 is used to indicate whether a row is deleted in a given version. Thus, as shown in rows 511(1), pessimistic version 403(1) is specified in table 501 by including a row for each employee whose row is to be deleted. Version number field 503 indicates that these rows have been changed in version 1 and delete flag 507 indicates that the rows have been deleted in that version. Current level version 403(3) is specified in the same way at 511(2), and optimistic version 403(5) is specified at 511(3).

In a preferred embodiment, the views for the workspaces are generated dynamically from a view which appears in built-in objects 515 as emp_table view 518. This view is simply a view of emp_table LT 501 which does not include the columns that contain version information 502. For a given version v 503, the view (v) for the version v shows the set of rows from <table_name>_LT such that the deleted flag field of the row is 'N' and one of the following holds:

the row is tagged with version v.

the row is tagged with a version v' that is at a higher level in the hierarchy than v AND the child version field of the row does not contain a version that is between v' and v in the hierarchy.

To make the result 513 corresponding to pessimistic version 403(1), the database system returns a result which includes all rows of emp_table 518 which correspond to rows of emp_table_LT 501 for which the deleted flag is 'N' and one of the following holds:

the row is tagged with version 1 the row is tagged with version 0 and the child version field of the row does not contain the version 1.

Thus, the rows belonging to 511(1 . . . 3) are all excluded because their delete flags are set to "Y" and those rows in 511(0) are excluded whose child vers field 505 contains the value "1", leaving the rows whose name fields 405 have the values Finch, Johnson, and Meyers, which is the result shown at 513. The results for the other versions 521 and 523 are produced in the same fashion.

As shown at 515, in addition to emp_table view 518, the versioned relational database system includes auxiliary views 517 for showing conflicting rows on a merge operation, for showing locked rows, for showing differences between two versions, and for simultaneously showing data for multiple versions. The versioned relational database system also includes INSTEAD_OF triggers 519 for transforming insert, update, and delete operations on view 518 into operations on the proper rows of the tables used to generate the query results for the various versions.

Another example of a versioned database system is disclosed in U.S. Pat. No. 5,890,166, Eisenberg, et al., Versioned database management system in which tasks are associated with promote groups which comprise a set of parts whose changes are to be promoted, issued Mar. 30, 1999. A feature of the versioned database system of Eisenberg which is of particular interest in the present context is that the versioning is done at the level of individual rows, as well as at the level of subsets of tables, as in the Oracle Workspace Manager. Eisenberg terms his versions at the subset level variants. Variants are thus the equivalent of workspaces. Like workspaces, variants are strictly hierarchical. At the level of the row, Eisenberg's versioned database system records the previously existing version or versions of a row that a given row was derived from and provides derivation graphs for its records. Because the rows may be derived from more than one version, the derivation graph is a directed acyclic graph, or DAG.

A problem with both the Oracle Workspace Manager and Eisenberg's versioned database system is that at the level of variants or workspaces, both the Oracle Workspace Manager and Eisenberg's versioned database system are organized hierarchically, that is, a given variant or workspace may be derived from only one previously-existing variant or workspace. The variant or workspace from which the given variant or workspace is derived is often termed the given subset's parent. The limitation that a given variant or workspace may have only one parent often prevents the organization of the versioned database system from reflecting the way in which the work on the versions is done. To give a simple example: the workspaces of FIG. 4 are being made to explore alternative layoff strategies; such strategies are typically the concern both of the human resources department, which is specialized in such matters, and of the general management of the company, which must live with the consequences of the strategy that is finally adopted. What is needed to reflect this organizational reality is a versioned database system which permits a workspace to have more than one parent workspace, so that the workspaces for the layoff strategies may have a HR parent workspace and a management workspace. In graph-theoretic terms, what is needed is a versioned relational database system in which parent-child relationships between workspaces may have the form of a DAG as well as that of a hierarchy. It is an object of the techniques disclosed herein to provide such a versioned relational database system.

SUMMARY OF THE INVENTION

The foregoing object is attained through a versioned relational database system that has a source in the relational database system of several versions of data. The VRDBS has a number of workspaces, each of which gives access to a version of the data and has metadata which specifies relationships among the workspaces such that a workspace may have more than one parent workspace.

Another aspect of the invention is a processor that performs operations on the versions of the data in the workspaces, the manner in which an operation is performed being determined at least in part by the metadata and the operation further updating the metadata as required for the operation. The operations include an operation that makes a first workspace into an additional parent of a second workspace, and an operation that removes a first workspace as a parent of a second workspace.

Still another aspect of the invention is metadata that specifies a multi-parent graph for a workspace that has multiple parents. The multi-parent graph is part of a directed acyclic graph defined by the relationships that the metadata specifies among the workspaces. The multi-parent graph includes for a given multi-parent workspace the given multi-parent workspace, all of the parents of the given multi-parent workspace, and all workspaces that are ancestors of the parents of the given multi-parent workspace in the directed acyclic graph up through the nearest common ancestor of all of the parents. The given multi-parent workspace is a leaf node of its multi-parent graph, the parents and the parents' ancestors in the directed acyclic graph up to but not including the nearest common ancestor are intermediate nodes, and the nearest common ancestor is a root node.

A further aspect of the invention is a processor that performs operations on the versions of the data in the workspaces, the manner of performance of an operation being determined at least in part by the multi-parent graph. The operations include a merge operation that specifies a leaf node of the multi-parent graph. The merge operation merges the versions of the data that are accessible via the leaf and intermediate workspaces of the multi-parent graph with the version of the data that is accessible via the root node. The merge operation may further remove all of the workspaces belonging to the multi-parent graph except the root workspace. The operations also include a refresh operation on a leaf node of a multi-parent graph that refreshes the version in the leaf node from the versions in the root and intermediate nodes.

In a yet further aspect of the invention, certain of the operations on a workspace that belongs to a multi-parent graph or on a version of the data in such a workspace use the multi-parent graph to determine whether the operation violates a constraint with regard to versions of data in other workspaces in the multi-parent graph. The constraints include primary key constraints, unique key constraints, and referential integrity constraints.

Other objects and advantages will be apparent to those skilled in the arts to which the invention pertains upon perusal of the following Detailed Description and drawing, wherein:

BRIEF DESCRIPTION OF THE DRAWING

FIG. 3 shows the tables used for the metadata for the multiple parents in the preferred embodiment;

FIG. 8 shows a hierarchy of workspaces and the versions they contain.

Figure 1:
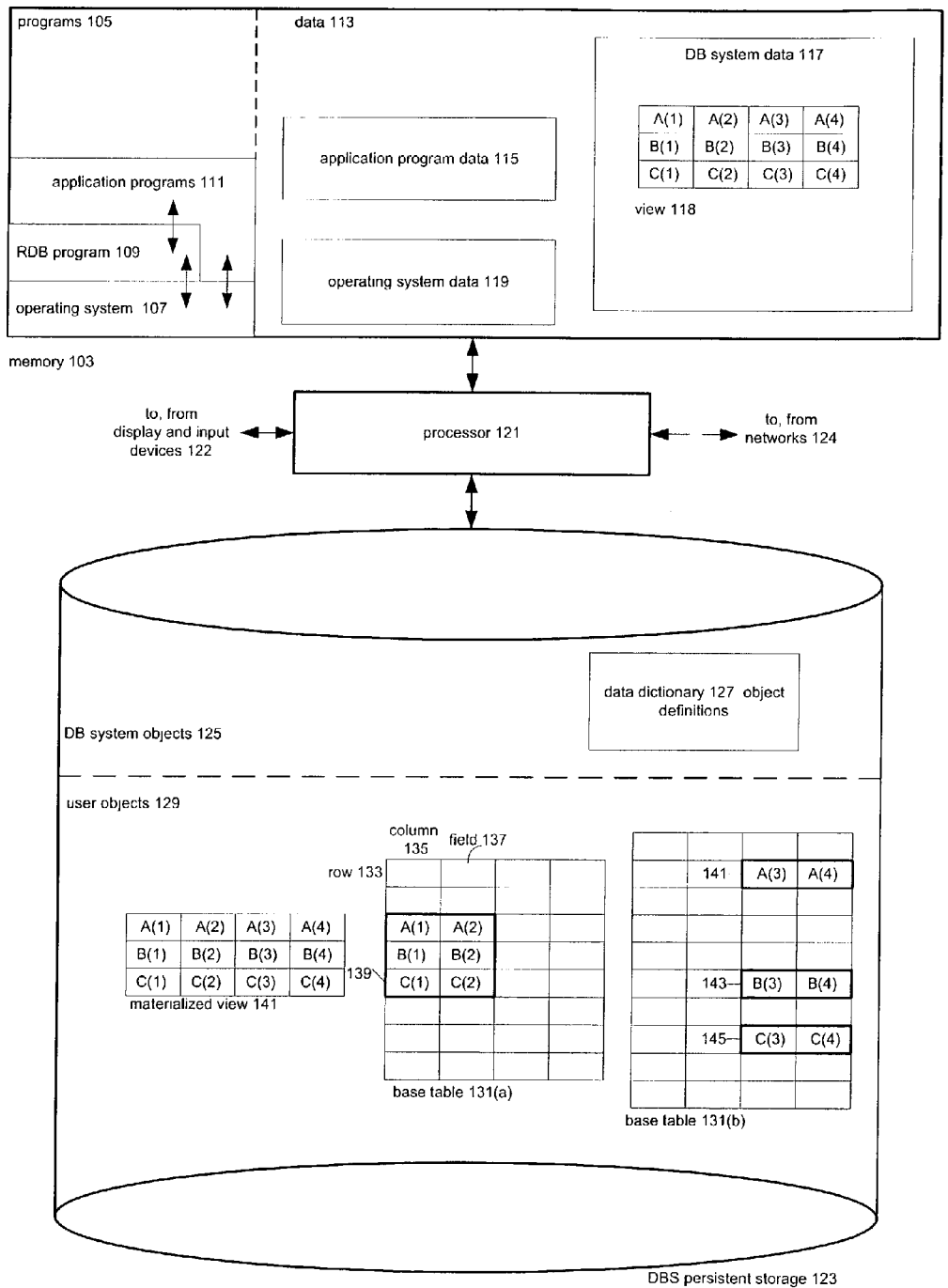
FIG. 1 is an overview of a relational database system.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first give an example of a versioned relational database system in which a version may have multiple parents and will then present details of a preferred embodiment based on the Oracle Workspace Manager.

Figure 2:
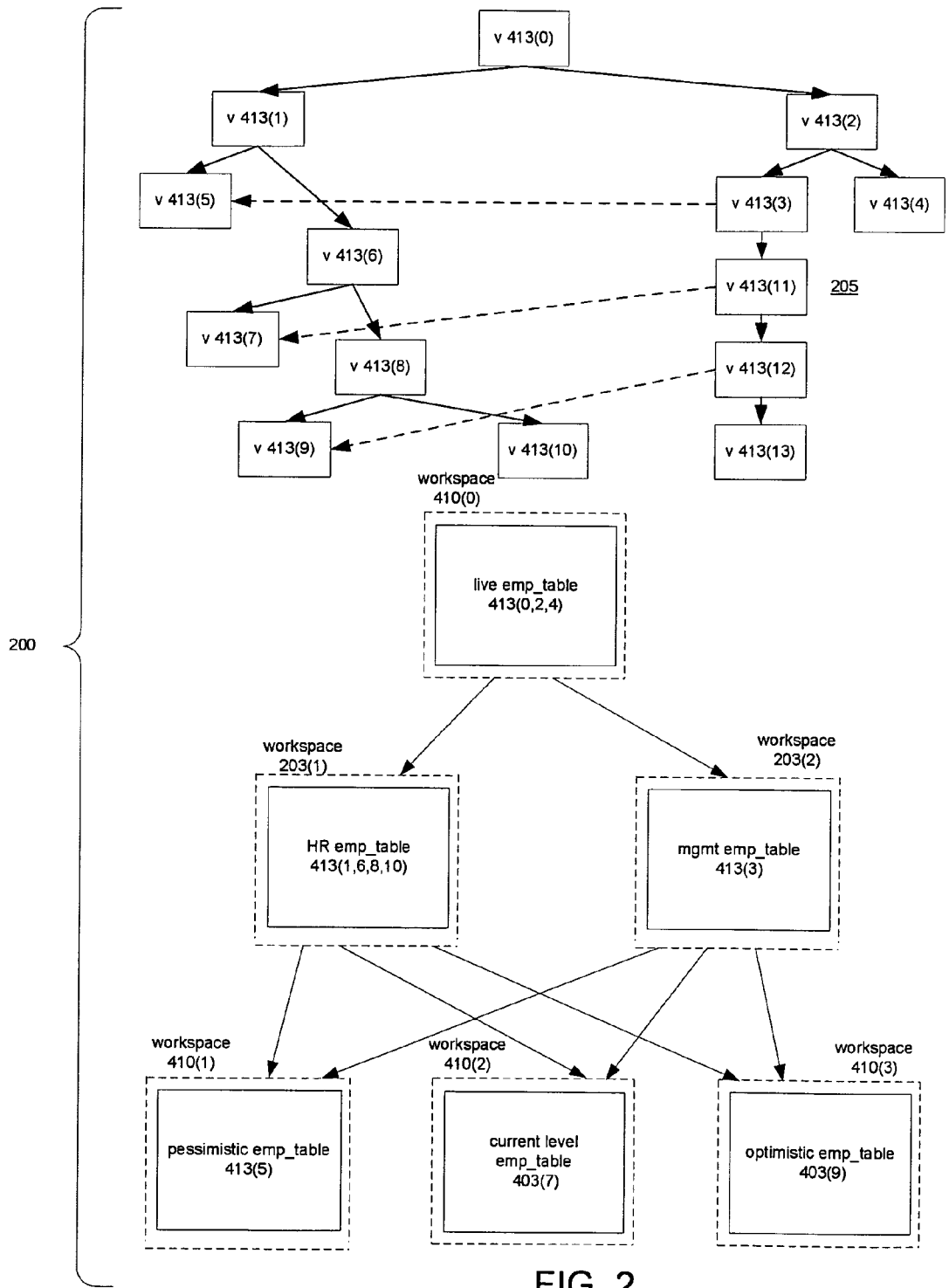
FIG. 2 is a conceptual overview of a versioned relational database system in which a version may have multiple parents.

Example Versioned Relational Database Wherein a Workspace May Have Multiple Parents: FIG. 2

Figure 4:
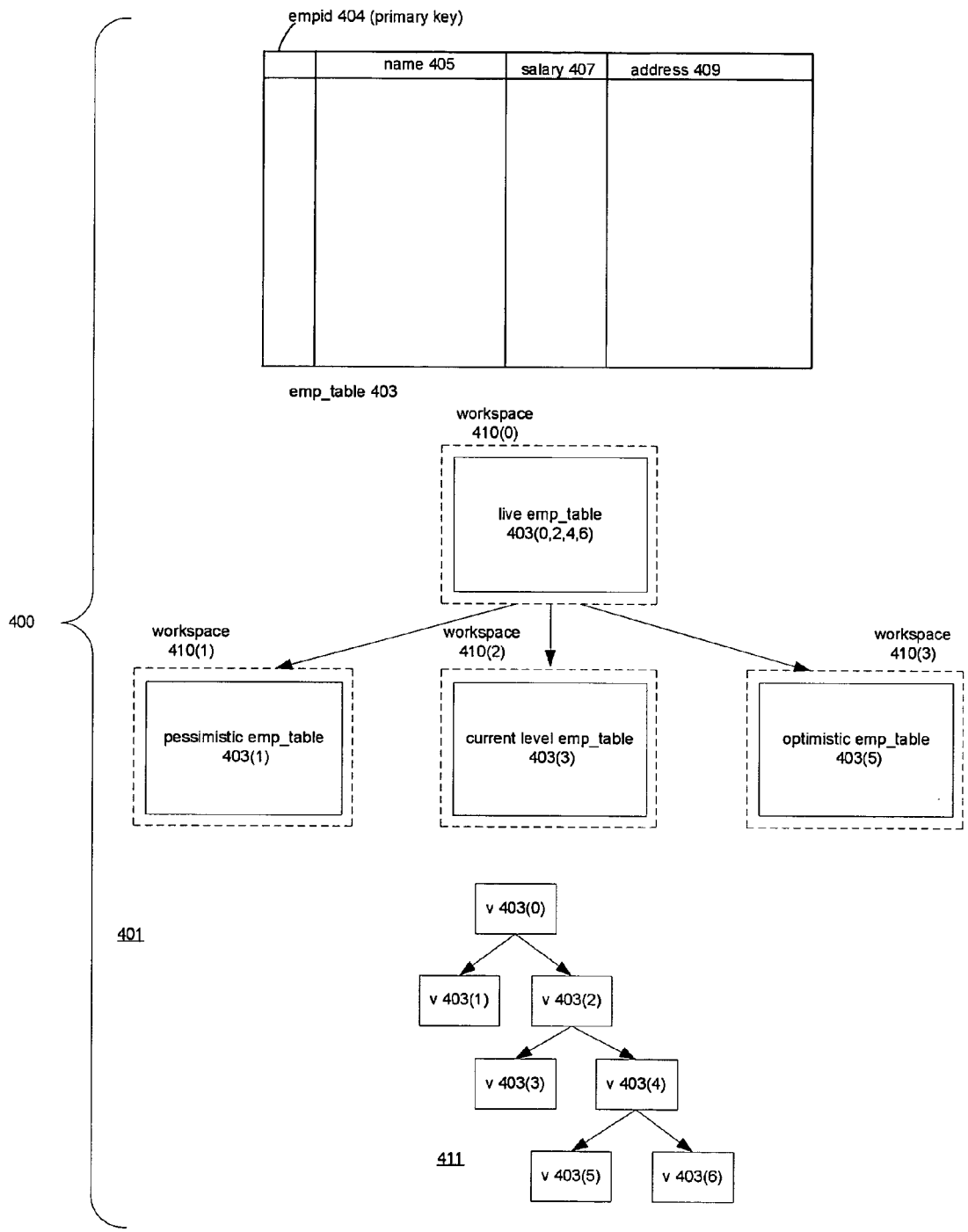
FIG. 4 is a conceptual overview of a versioned relational database system.

FIG. 2 shows at 200 the versioned relational database of FIG. 4 as it might be modified in a versioned relational database system that permitted a workspace to have more than one parent. As before, the workspaces in versioned relational database 201 contain versions of live emp_table 403(0). In FIG. 2, only each workspace's current version is shown. However, versioned relational database 201 contains two new workspaces, workspace 203(1) and workspace 203(2), which serve the HR department and the management respectively. Each of these workspaces is a child of workspace 410(0), and each is a parent of each of workspaces 410(1 . . . 3). Each of workspaces 410(1 . . . 3) thus has two parents. Changes in the current version in either of the parents may be propagated down to the current versions in the children and changes in a current version in a child may be propagated up through both parents to the current version in workspace 410(0).

Versions with Multi-parented Workspaces

When a workspace is added as an additional parent to a given workspace, the given workspace's current version remains in the version hierarchy in which it was created and also becomes a child of the additional parent's current version. Thus, when a workspace has multiple parents, a version may also have multiple parents and the version hierarchy, like the workspace hierarchy, becomes a directed acyclic graph.

This is illustrated in FIG. 2. In that Figure, the order of creation of the workspaces is workspace 410(0), 203(1), 203(2), 410(1), 410(2), and 410(3). After workspace 410(3) has been created, workspace 203(2) is made an additional parent of workspaces 410(1 . . . 3). The add parent operation that makes a workspace an additional parent also does an implicit savepoint, thus producing a new version in the additional parent. In FIG. 2, there have been no explicit savepoint operations, so the versions are those created implicitly by the workspace creation and add parent operations. The versions created by the add parent operations are v 413(11-13). The resulting DAG of versions is shown at 205. In DAG 205, the arcs resulting from workspace 203(2) becoming an additional parent of workspaces 410(1 . . . 3) are shown with dashed lines.

The version DAG is important in determining versions that must be checked for constraint violations when a given version is changed. As is explained in detail in the Agarwal patent application cited above, the versions that must be checked for constraint violations are the given version itself and all versions which are ancestors of the given version in the DAG. The given version itself and its ancestors are termed for constraint checking purposes the ancestry of the given DAG. The ancestry of v 413(9) is v 413(8), v 413(6), v 413(1), v 413(0), v 413(12), v 413(11), v 413(3), and v 413(2).

Procedures belonging to RDB program 109 as modified to produce and manipulate versioned relational database 201 permit users of the relational data base system to do the following new operations on versioned relational database 201:

specify that any workspace that already exists in relational database 201 may be added as a parent for another workspace for which the parent is not already an ancestor; and specify that an added workspace no longer be a parent.

As will be explained in detail in the following, the change propagation operations have been modified to take into account the fact that a workspace may have multiple parents. The changes in the change propagation operations also require changes in the mechanism for detecting constraint violations.

Versioned database 201 was created by making live_emp_table 403(0) into a version-enabled table, which in turn resulted in the creation of workspace 410(0) containing version 403(0), creating workspaces 203(1 and 2) as children of workspace 410(0), then creating workspaces 410(1 . . . 3) as children of either of workspaces 203(1) or 203(2), and then adding the other of workspaces 203(1) or (2) as a parent to workspaces 410(1 . . . 3). A refresh operation on any of workspaces 410(0 . . . 3) will not only affect the current version in that workspace, but also affect current versions in workspaces 203(1) and 203(2) and a merge operation on any of workspaces 410(1 . . . 3) will affect the current versions in workspaces 410(0), 203(1), and 203(2), since they are ancestors of workspaces 410(1 . . . 3).

It is useful to introduce some terminology for discussing versioned database 201:

multi-parent workspace graph: When a workspace is added as a multi-parent to another workspace, the workspace to which the parent has been added, the parents of that workspace, and the parents' ancestors back to the nearest common ancestor form a Directed Acyclic Graph (DAG) which is called a multi-parent workspace graph. In FIG. 2, workspaces {410(1), 203(1), 203(2), 410(0)} form a multi-parent workspace graph.

multi parent graph workspaces: When a workspace is added as a parent to another workspace, the workspace to which the parent has been added, the parents of that workspace, and the parents' ancestors back to the nearest common ancestor of the parents form a set of workspaces that are termed multi-parent graph workspaces. In FIG. 2, the multi-parent graph workspaces are the sets of workspaces {410(1), 203(1), 203(2), 410(0)}, {410(2), 203(1), 203(2), 410(0)} and {410(3), 203(1), 203(2), 410(0)} multi parent graph branch: A linear chain of workspaces from leaf to root of multi-parent graph is called a multi-parent graph branch. Thus the multi-parent graph branches from in the multi-parent graph workspaces {410(1), 203(1), 203(2), 410(0)} are the chain of workspaces 410(1), 203(1), 410(0) and the chain of workspaces 410(1), 203(2), 410(0).

default-parent: The parent workspace at the time of creation of a workspace is called its default-parent. In FIG. 2, if workspace 410(1) was created from workspace 203(1), then workspace 203(1) is the default-parent of workspace 410(1).

additional-parent: The workspace(s) added later on are called additional-parents. If workspace 203(1) is workspace 410(1)'s default parent, then workspace 203(2) is its additional-parent.

Metadata for Workspaces with Multiple Parents: FIG. 3

As explained in the Description of related art, the versioned database system of the preferred embodiment uses metadata in the version-enabled tables and in related auxiliary tables to specify which versions of a version-enabled table a given row in the table belongs to. The additional metadata required for workspaces with multiple parents is shown at 301 in FIG. 3. The values in the fields of the table relate to the graph of multi-parent workspaces shown at 335 in FIG. 3. In that graph, the versions of the version-enabled table are indicated by v# in the centers of the nodes, while the workspaces are indicated by w# to the left or right of the nodes; thus node 341 represents workspace 2, as indicated by "w2", and workspace w2 contains the third version of the version-enabled table, as indicated by "v3". In graph 335, w5 is the only multi-parented workspace. Assuming that w5 was created from w3, w5's default parent is w3; its additional parent is w4.

Beginning with wm$ancestor_workspaces_table 303, table 303 is part of the metadata for the version-enabled tables described in the Description of related art. Each workspace in MP graph 335 but LIVE workspace 337 has at least one ancestor, and there is an entry for each ancestor in table 303. There are three columns in the table: workspaces 305, ancestor workspaces 307, and ancestor versions 309. Each workspace that has an ancestor has a row in table 303, with the workspace being specified in column 305. In the workspace's row, the value of the field in column 307 specifies an ancestor workspace of the workspace specified in col. 305 and the value of the field in column 309 specifies the current table version in the ancestor workspace. As modified for multi-parent workspaces, there is a row in table 303 for the ancestors through all of the parent workspaces. Thus, there will be five rows for workspace w5 represented by node 345 in table 303; one each for its ancestors w3, w4, w2, and LIVE. The row for ancestor w4 is shown in table 303, as expected, with ancestor version v4.

wm$workspaces_table 311 in the single-parent VRDBMS had a row for each workspace, with field 313 indicating the workspace and 315 its parent, as well as other information about the workspace that is not relevant to the present context. In the multi-parent VRDBMS, a new column, isMP 317 has been added. The column's values are flags indicating whether the workspace to whose row the isMP field belongs is a multi-parent workspace. If the workspace is a multi-parent workspace, it will have a row in wm$workspaces_table 311 for each of its parent workspaces. Thus, in addition to the row for workspace w5 shown in the table, there will be another for w5 in which the parent workspace specified in column 315 is w3.

The version hierarchy is recorded in wm$version_hierarchy_table 333. Each row has three fields, field 335 identifying a version, field 337 identifying a parent version for the version in field 335, and field 339 identifying the workspace to which the version specified in field 335 belongs. The parent version is the version from which version 335 was originally made.

Thus, in table 333, v0 is in the LIVE workspace and has no parent, so field 337 has a null value and field 339 specifies the LIVE workspace, while v1, which is the current version in the LIVE workspace but has as its parent v0, has v0 in field 337 and LIVE in field 339. Further, version v5 is presumed to have been originally made from v3, so the entry for v5 specifies v3 in field 337.

wm$mp_leaf_workspace_table 319 and wm$mp_graph_table 325 are tables that have been added to the VRDBMS to deal with multi-parented workspaces. wm$mp_leaf_workspace_table 319 lists the additional parent workspaces which have been added to a workspace. Each row has two fields: one designating the workspace to which the additional parent has been added and one designating the additional parent workspace. A workspace has a row in table 319 for each additional parent workspace. Thus, workspace w5, whose default parent is w3 and whose additional parent is w4, has the single entry shown.

wm$mp_graph_table 325 lists the workspaces in the VRDBMS that belong to multi-parent graphs. A multi-parent graph for a workspace that has multiple parents includes the multi-parent workspace, the parents of that workspace, and the ancestors of the parents up through the nearest common ancestor of the parents of the multi-parent workspace. Thus, in graph 335, the multi-parent graph for workspace w5 is w5, w3, w4, w2. w5 is termed the graph's leaf node, w3 and w4 are intermediate nodes, and w2 is the root node. The leaf node is the node with the multiple parents; the root node is the nearest common ancestor of the multiple parents; the intermediate nodes are the nodes between the root and the leaf.

In table 325, each workspace that is a leaf node for a multi-parent graph has rows for all of the workspaces that belong to the multi-parent graph, including the leaf workspace itself. Each row identifies the leaf workspace (327), a workspace belonging to the multi-parent graph (329), and whether the workspace specified in field 329 is a leaf node, an intermediate node, or a root node (331).

The foregoing tables are further used in the creation of two views: wm$current_parent_versions_view and wm$mp_graph_versions_view. The first of these views is produced by a join of wm_ancestor_workspaces_table 303 and wm$version_hierarchy_table 333:

create view wm$current_parent_versions_view as select
      vht.version from
      wmsys.wm$version_hierarchy_table vht,
      wmsys.wm$ancestor_workspaces_table awt
   where   awt.workspace=SYSTEM_CONTEXT('CURRENT_WORKSPACE')
      and vht.workspace=awt.anc_workspace
      and vht.version<=awt.anc_version
   union all
   select version from wmsys.wm$version_hierarchy_table
      where workspace=SYSTEM_CONTEXT('CURRENT WORKSPACE');

This view is used to present the latest copies of each primary key depending on the user's CURRENT_WORKSPACE.

The second view includes all of the versions belonging to a given multi-parent graph workspace. It is used for constraint checks during DML and in merger operations involving multi-parent workspace graphs. The query that produces wm$mp_graph_versions_view is the following:

create view wm$mp_graph_versions_view as
      select mpt.mp_leaf_workspace, mp_graph_flag,
         vht.workspace, vht.version from wm$mp_graph_table mpt,
    wm$version_hierarchy_table vht
    where mpt.mp_graph_workspace=vht.workspace ;

As an optimization, the preferred embodiment has a session variable called CURRENT_MP_LEAFS for each user of the VRDBMS. The session variable stores the leaf-workspaces of the all the multi-parent graphs the current workspace is part of. The session variable is used to check constraints across all the versions in the multi-parent graphs the current workspace is part of. When the information in the session variable is used to query wm$mp_graph_versions_view, all of the versions can be evaluated. The query looks like this:
    select version from wm$mp_graph_versions_view
    where mp_leaf_workspace
        in SYSTEM_CONTEXT('CURRENT_MP_LEAFS')
    and mp_graph_flag in ('I', 'L') ;
'I' specifies an intermediate workspace and 'L' a leaf workspace.

Enforcing Constraints in Multi-parent Workspaces

Constraints are enforced in multi-parent workspaces when an additional parent is added or removed and when operations are performed on the workspace's tables. In a preferred embodiment, three kinds of constraints are enforced by the VRDBMS:
1. primary key constraints: these constraints involve a record's primary key, that is a field in the record that should be unique in the table to which the record belongs and that is used as the record's primary key;
2. unique key constraints: these constraints involve a unique key in a record, that is, a field in the record which should be unique in the table to which the record belongs, but is not the primary key; and
3. referential integrity constraints: these constraints involve a field in a record whose value is a key to a record in another table.

Splits

In the context of a VRDBMS system with workspaces having multiple parents, the primary key constraints and the unique key constraints involve splits. A split occurs in a VRDBMS system with hierarchical workspaces when current versions of a table contained in different branches of the workspace hierarchy have corresponding records with fields that have different values. For example, in the hierarchical VRBDMS of FIG. 4, pessimistic emp_table 403(1) and current level emp_table 403(2) are both descendants of live emp_table 403(0). Each has a different version of emp_table 403 and each occupies a different branch in the hierarchy. Both table 403(1) and table 403(2) have a record for Johnson. If one of those records has a value of $18,000 in salary field 407 and the other a value of $20,000, a split in the record for Johnson has occurred.

Splits are not a problem in a VRDBMS with hierarchical workspaces because there can be only one copy of each primary key or unique key visible at any given workspace. Further, change propagation operations only propagate changes from a current version in a child workspace to a current version in the child workspace's single parent workspace or from a current version in the single parent of a child workspace to a current version in the child workspace. When multi-parent workspaces are permitted, a version in a multi-parent workspace may see duplicate copies for a primary key or unique key if the key is split between the parent workspaces. Also, changes may be propagated from the current versions of the child workspace, its multiple parents and their ancestors to the current version of the root workspace or from the current versions of multiple parents and their ancestors to the current version of the leaf workspace, and because that is the case, splits must be avoided in the multiple parent graph in which the child workspace is the leaf node.

There are two kinds of splits: splits proper (termed hereinafter simply "splits") and logical splits. A split is said to have occurred when a record that is included in a table in a workspace that has descendant workspaces has the same primary key in versions in descendant workspaces belonging to two branches but the records in the versions have different values in a field other than the primary key.

Figure 5:
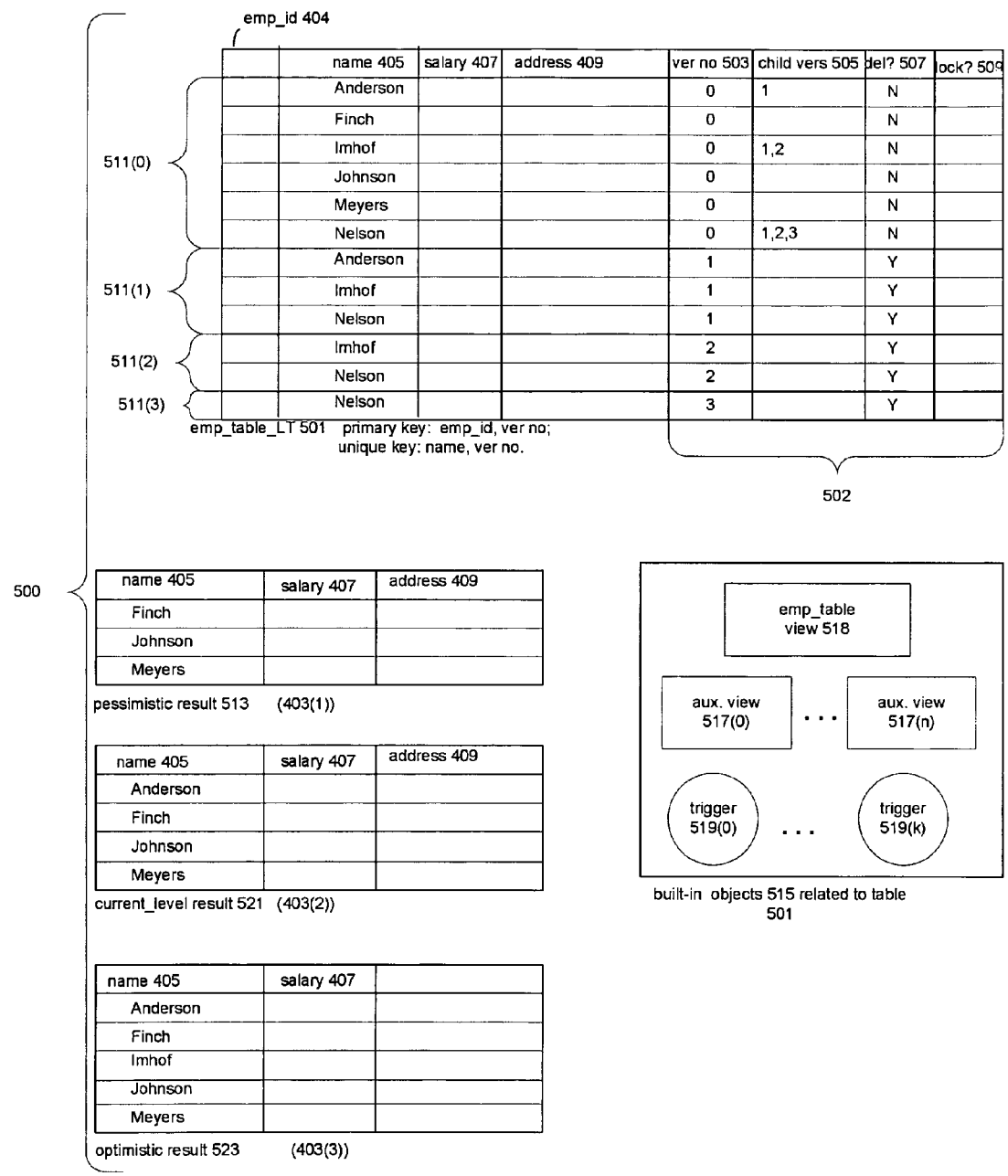
FIG. 5 shows an implementation of a versioned relational database system.

A logical split is said to have occurred when a record that is included in a table in a workspace that has descendant workspaces has the same unique key in versions in descendant workspaces belonging to two branches but the records in the versions in the descendant workspaces have different primary keys The following examples are based on FIGS. 2 and 5. For the split, assume that HR emp_table 505(1) in workspace 203(1) and mgmt emp_table 505(2) have records with the same values in emp_id field as in LIVE emp_table 403(0), but different values for the salary field:

a. record 101 in HR emp_table 505(1) of workspace 203(1)

| emp_id 404 | name 405 | salary 407 |
|---|---|---|
| 101 | Anderson | 20,000 | b. record 101 in mgmt emp_table 505(2) of workspace 203(2)

| emp_id 404 | name 405 | salary 407 |
|---|---|---|
| 101 | Anderson | 18,000 |

Since the record with emp_id 404=101 in the two workspaces has different values in salary field 407, there is a split.

For the logical split, presume that the record in live emp_table 403(0) for Anderson was deleted in mgmt_emp_table 505(2) and then later added again with a new emp_id 404, so that the records for Anderson in HR emp_table 505(1) and mgmt emp_table 505(2) look like this:

c. record 101 in HR emp_table 505(1) of workspace 203(1)

| emp_id 404 | name 405 | salary 407 |
|---|---|---|
| 101 | Anderson | 20,000 | d. record 101 in mgmt emp_table 505(2) of workspace 203(2)

| emp_id 404 | name 405 | salary 407 |
|---|---|---|
| 120 | Anderson | 18,000 |

Here, because the two tables have records with the same unique key values (Anderson) but different primary key values (101 and 120), the result is a logical split.

Figure 7:
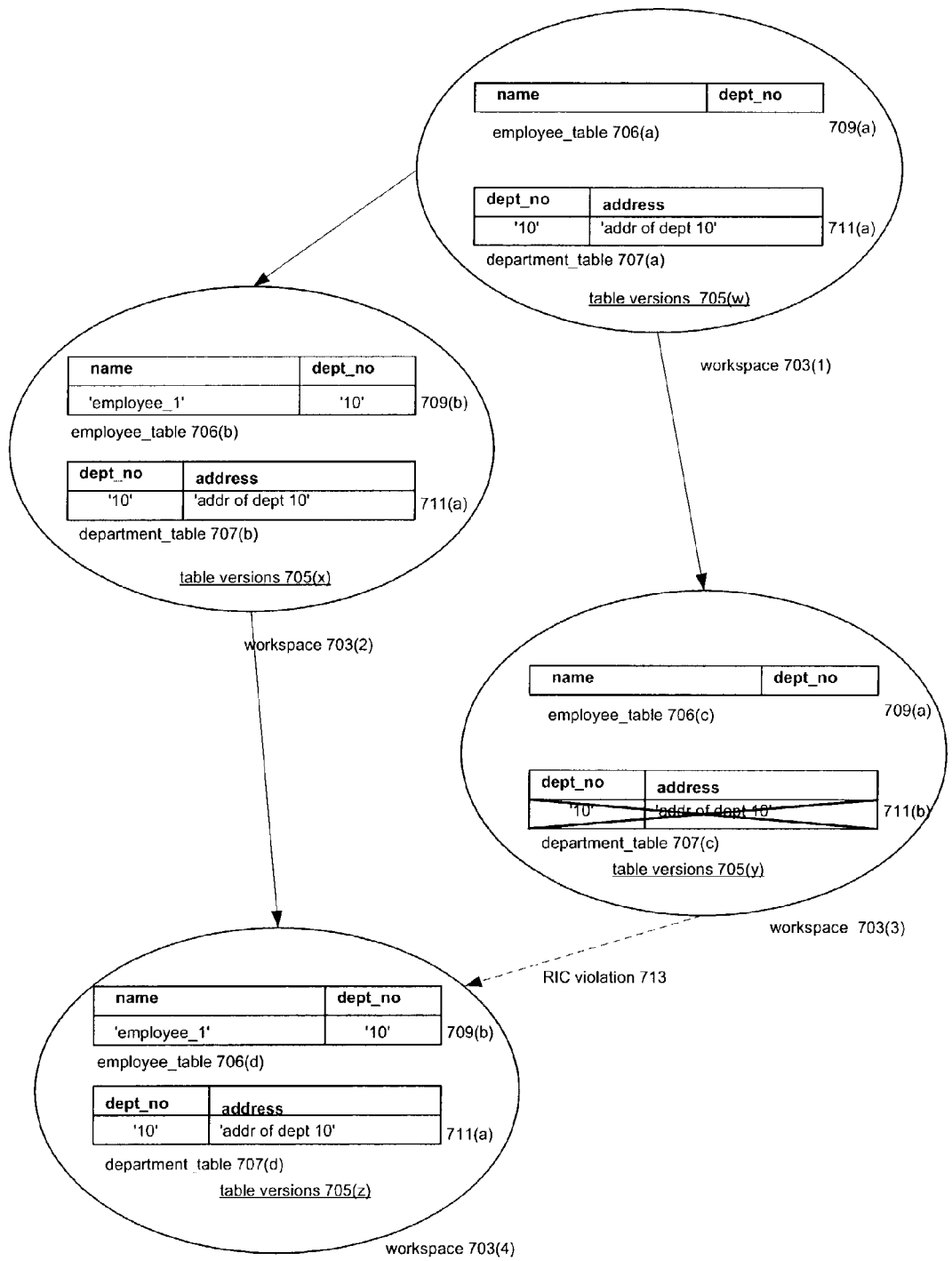
FIG. 7 shows an example of a relational integrity constraint violation in a multi-parent graph.

Referential Integrity Constraints: FIG. 7

FIG. 7 shows a portion 701 of a VRDBMS that consists of four workspaces 703: workspace 703(1), which is the parent of workspaces 703(2 and 3), and workspace 703(4), which is a multi-parent workspace. Workspace 703(4)'s default parent is workspace 703(2) and its additional parent is workspace 703(3). Each workspace has versions 705 of two versioned tables, employee_table 706 and department_table 707. Table 705 has two columns: one for the employee name, which is the primary key, and one for a department number. The value in the department number column is a primary key for a record in department table 707, which has two fields: the primary key dept_no and one for the department address. Shown in FIG. 7 are rows in the current versions of these tables at the time that workspace 703(3) is to become an additional parent of workspace 703(4). Rows that are of interest for the constraint check are shown in each of the current versions. Where the row is identical in two versions, the row has the same reference number. Thus, row 711(a) is found in versions 707(a, b, and d) of department_table, but has been deleted from version 707(c). Likewise, row 709(b) is identical in versions 706(b) and 706(d) of employee_table, but is not present in versions 706(a) and 706(c).

Two alterations of table version 705(w) are interesting in the present context. In the first alteration, made in version 705(x), a row 709(1) was added to employee_table 706(b) which has the value '10' in its dept_no field. There is no such row in employee_table 706(a) or in employee_table 706(c). In the second alteration, made in version 705(y), the row 711(b) whose dept_no field has the value '10' has been deleted; consequently, there is no row in department_table 707(c) corresponding to row 711(a) of department_table 707(b) or to row 711(a) of department_table 707(d). Workspace 703(4) now has as one of its ancestors a workspace whose department_table 707(c) does not contain a row whose key appears in row 709(b). Such a situation violates the referential integrity constraint, as indicated at 713. It should be noted here that because there is no ancestor-descendant relationship between workspace 703(2) and workspace 703(3), there is no violation of the referential integrity constraint between those workspaces.

The alteration in workspace 703(3)'s department_table 707(c) may have occurred either before workspace 703(3) became an additional parent of workspace 703(4) or after that event; in the former case, the RIC violation occurs when there is an attempt to make workspace 703(3) an additional parent of workspace 703(4); in the later case, the RIC violation occurs when the attempt is made to delete row 711(a) in table 707(c). Of course, a RIC violation would also have occurred if row 711(a) had been deleted in workspace 703(2) but not in workspace 703(3).

Making Constraint Checks

In general, splits, logical splits, and RIC violations may occur in following situations:
1. Whenever a workspace is added or removed as an additional parent. The result of such an action is the creation of a multi-parent graph or the modification of an existing multi-parent graph;
2. Whenever a version of a table in a workspace that belongs to a multi-parent graph is altered; and
3. Whenever a workspace that is parent of a leaf-workspace is removed as a parent, an RIC violation can occur.

In the following, the constraint checks made in each of these situations are described in detail.

Constraint Checks When an Additional Parent is Added to or Removed from a Workspace When a workspace is added or removed as an additional parent to another workspace, the following constraints are checked:
   primary key constraint: this constraint is violated on addition or removal of a workspace as an additional parent if the addition or removal of the additional parent results in a split of a record in the workspaces that belong to the new multi-parent graph that results from the addition or removal of the additional parent. In a preferred embodiment, an optimization is employed which requires that one of the split records has to belong to a workspace in the multi-parent graph branch being created by the addition of the parent.
   unique key constraint: this constraint is violated on addition or removal of a workspace as an additional parent to a workspace if the addition or removal of the parent results in a logical split of a record in the workspaces that belong to the new multi-parent graph that results from the addition or removal of the parent; as with splits, one of the logically split records has to belong to a workspace in the multi-parent graph branch being created by the addition of the parent.
1. referential integrity constraint: When a workspace is added or removed as an additional parent of another workspace, a referential integrity constraint between a version of a table in the workspace that is added or removed as an additional parent and a version of another table in a descendant of the added or removed workspace may be violated where the descendant belongs to the multiparent graph that results from the addition or removal of the additional parent workspace. This kind of referential integrity constraint is described in detail above.

The checking is done as part of the procedure which adds a parent workspace to a given workspace.

Constraint Checks Made When an Operation Results in a Change in a Row in a Table Version Whose Workspace Belongs to a Multi-parent Graph When an operation results in a change in a row in a table version whose workspace belongs to a multi-parent graph, RIC and unique key constraint checks are made on the versions belonging to the ancestry of the table version whose row was changed. These constraint checks are described in detail in the related patent application, Ramesh Vasudevan, Sanjay Agarwal, Ramkrishna Chatterjee, and Benjamin Speckhard, Versioned relational database system with an optimistic constraint model. Additionally, checks are made for primary key, unique key, and RIC constraint violations as described in the present application:
   primary key constraint: this constraint is violated if the change in the row creates a split with regard to the row in the workspaces of the multi-parent graph.
   unique key constraint: this constraint is violated if the change in the row creates a logical split with regard to the row in the workspaces of the multi-parent graph.
   referential integrity constraint: A change in a row may also violate a referential integrity constraint between a version of a table in a workspace in the multiparent graph and a version of another table in a descendant of the workspace that also belongs to the multiparent graph, as described in detail above.

Operations Based on Multi-parent Workspace Graphs

As regards operations performed on a multi-parent workspace's contents, the multi-parent workspace is like a single-parent workspace. The operations that are different are those that either affect the structure of the multi-parent workspace graphs to which the multi-parent workspace belongs or follow that structure. The following operations affect the structure of the multi-parent workspace graph:
- providing an additional parent workspace for a workspace;
- taking an additional parent workspace from a workspace;
- merging a leaf workspace when the merge operation specifies removal of the non-root workspaces in a multi-parent workspace graph.

The operations that follow the structure of the multi-parent workspace graph are
- refresh, both explicit and continual; and
- merge when the merge operation does not specify removal of the non-root workspaces.

Each of these operations other than continual refresh has an application programmer's interface (API) in the preferred embodiment; these APIs are presented and explained in the following.

procedure AddAsParentWorkspace(mp_leaf_workspace varchar2, parent_workspace varchar2) ;
Description:
　This procedure adds parent_workspace as an additional-parent to mp_leaf_workspace. An implicit savepoint operation is performed in parent_workspace.
Parameters:
　mp_leaf_workspace: The workspace for which a parent workspace is being added.
　parent_workspace: Name of the parent workspace.
Exceptions:
　An exception will be raised if any of the following is true:
　　mp_leaf_workspace or parent_workspace does not exist.
　　The parent_workspace is already in the ancestor hierarchy of the mp_leaf_workspace.
　　If adding the parent workspace results in a constraint violation for the version in mp_leaf_workspace. One or more of the following constraints may be violated.
　　　Primary key constraint
　　　Referential integrity constraint
　　　unique key constraint When the procedure adds the parent workspace, the procedure updates metadata tables 303, 311, 319, 325, and 333 to take the new relationships resulting from the addition of the parent into account.

procedure RemoveAsParentWorkspace(mp_leaf_workspace varchar2, parent_workspace varchar2);
Description:
　This procedure removes parent_workspace as an additional-parent of mp_leaf_workspace. Only the workspaces added by calling AddAsParentWorkspace can be removed using this call.
Parameters:
　mp_leaf workspace: The workspace from which the parent has to be removed.
　parent_workspace: The workspace to be removed as parent.
Exception:
　An exception will be raised if
　　mp_leaf_workspace or parent_workspace does not exist.
　　if mp_leaf_workspace has already versioned some data from parent_workspace or graph-branch consisting of parent_workspace.
　　There are active sessions in the mp_leaf_workspace (sessions with open database transaction)
　　An RIC constraint is violated because mp_leaf_workspace contains data that depends upon the data in the branch of the graph that is being removed.

In removing the parent workspace, the procedure updates metadata tables 303, 311, 319, 325, and 333 as required to reflect the removal of the parent workspace.

procedure MergeWorkspace(workspace varchar2, create_savepoint boolean,
　remove_workspace boolean, auto_commit boolean,
　merge_graph_for_mp boolean default true,
　remove_mp_graph boolean default false);
Description:
　If merge_graph_for_mp is true and workspace is a leaf-workspace of the multi-parent graph, then this procedure propagates the changes in the current versions in the non-root workspaces to the current version in the root workspace. Constraint checking is done as described above for all versions in which a row changes as a result of the merge operation.
Parameters:
　workspace: The leaf of multi-parent graph to be merged.
　create_savepoint: A Boolean value (TRUE or FALSE). TRUE creates an implicit savepoint in the root-workspace before the merge operation. FALSE (the default) does not create an implicit savepoint in the root-workspace before the merge operation.
　merge_graph_for_mp: If the workspace is multi-parent leaf workspace, merge the multi-parent graph to the root workspace. If this parameter is false, and workspace is multi-parent leaf workspace, then an error is raised.
　remove_mp_graph: A Boolean value (TRUE or FALSE). TRUE removes workspaces in the graph under the root-workspace after merging the graph data to the root. FALSE does not remove the graph workspaces under the root.
　auto_commit: A Boolean value (TRUE or FALSE). TRUE specifies that the procedure runs as an autonomous transaction and commits when done, while FALSE specifies that it runs in the context of the current (invoker's) database transaction.
Exceptions:
　Exceptions will be raised if
　　If auto_commit is TRUE and there is an open database transaction in any of the workspaces under the root-workspace.
　　If remove_parent_workspaces is true and there are sessions in any of the workspaces under the root-workspace.
　This procedure uses wm$mp_graph_table 325 to find the root workspace for the leaf workspace being merged. If remove_mp_graph is set to TRUE, the procedure uses wm$mp_graph_table 325 to find the workspaces that are to be removed. In performing the removal, the procedure updates metadata tables 303, 311, 319, 325, and 333 as required by the removal of the workspaces. Removal of workspaces as a consequence of the merge operation is discussed in detail later.

procedure RefreshWorkspace(workspace VARCHAR2, auto_commit BOOLEAN, refresh_graph_for_mp BOOLEAN);
　For a multi-parent workspace graph, this operation propagates changes from the workspaces in a leaf workspace's multi-parent graph to the leaf workspace. The changes are propagated beginning with the root workspace and continuing with the intermediate workspaces, i.e., each non-root workspace is refreshed. This operation can only be called on the leaf-workspace of the multi-parent workspace graph. Constraint checking is done as described above for all versions in which a row changes as a result of the merge operation.

Parameters:
- workspace: Name of the child workspace that is to be refreshed. The name is case sensitive.
- auto_commit: A Boolean value (TRUE or FALSE). TRUE (the default) causes the operation to be executed as an autonomous regular transaction that will be committed when it finishes. FALSE causes the operation to be executed as part of the caller's open regular transaction (if one exists). If there is no open regular transaction, the operation is executed in a new regular transaction. In either case, the caller is responsible for committing the transaction.
- refresh_graph_for_mp: A Boolean value indicating whether the workspace being refreshed must be a multi-parent workspace. If the value is set to FALSE and the workspace is a multi-parent workspace, an error condition is raised.

If refresh_graph_for_mp has the value TRUE and the workspace to be refreshed is a leaf workspace in a multi-parent workspace graph, then the leaf workspace and all of the intermediate workspaces in the leaf workspace's multi-parent graph are refreshed from the root workspace. Continual refresh works the same way as explicit refresh with regard to change propagation in the multi-parent workspace and constraint checking.

procedure RemoveWorkspaceTree(workspace VARCHAR2, auto_commit BOOLEAN);

This procedure removes the workspace specified in the workspace parameter and all of its descendant workspaces and discards all row versions associated with the workspace and its descendants. Depending on the implementation of the procedure, it may remove any descendants that are multi-parent workspaces or may delay removing a descendant multi-parent workspace until its last parent workspace is removed. The auto_commit parameter works as described above. As part of its operation, the procedure updates metadata tables 303, 311, 319, 325, and 333 as required by the removal of the workspaces.

Figure 6:
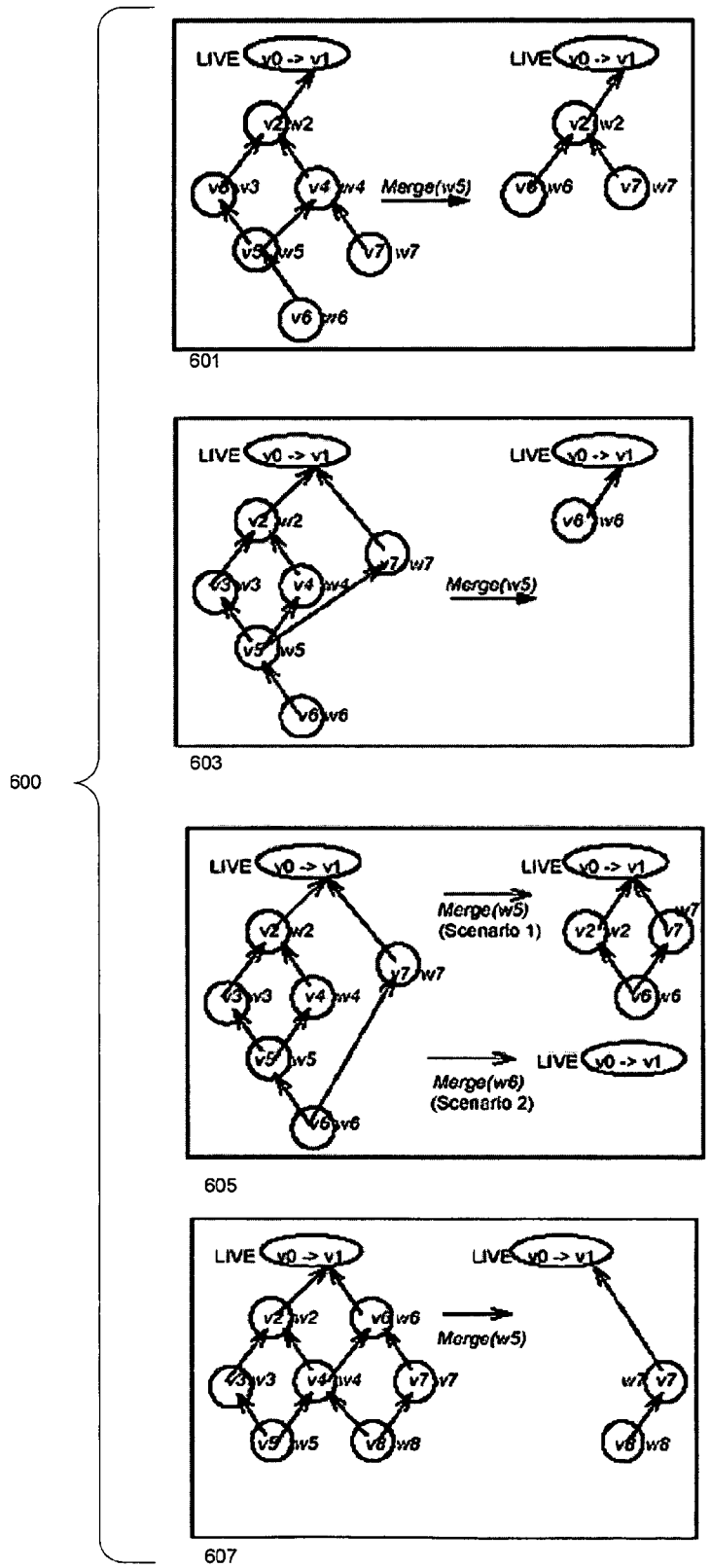
FIG. 6 shows examples of how a merge operation rearranges a multi-parent graph.

Examples of MergeWorkspace with remove_mp_graph=true: FIG. 6

FIG. 6 shows at 600 four examples 601-607 of the effect of a MergeWorkspace operation that merges a leaf workspace into the root workspace of its multi-parent graph and then deletes all workspaces in the multi-parent graph other than the root. Workspaces that are children of workspaces in the multi-parent graph but do not themselves belong to the multi-parent graph become children of the root workspace unless they are already descendants of the root workspace.

Beginning with example 601, the workspaces making up the multi-parent graph are w5, w3, w4, and w2, with current versions v5, v4, v3, and v2 respectively. The workspace being merged is leaf workspace w5; its parents are intermediate workspaces w3 and w4, and the root workspace is w2, which is the nearest common ancestor of w5's parent workspaces. At the end of the merge, changes from current versions v3, v4 and v5 have been propagated to current version v2 in w2, the workspaces w3, w4, and w5 have been removed from the graph of workspaces, and the workspaces w6 and w7, which are descendants of workspaces that belong to w5's multi-parent graph but are not otherwise descendants of w2, are now children of w2.

In 603, w5 has three parents: w3, w4, and w7. The nearest common ancestor of the parent workspaces is the LIVE workspace, and w5's multi-parent graph is w5, w3, w4, w7, w2, LIVE. Thus, by the rule given above, changes in v5, v3, v4, v2, and v7 are propagated to v1 in LIVE v5 and w6, which is a descendant of LIVE only via workspaces in the multi-parent graph, becomes a child of LIVE. In 605, w5 is the leaf workspace of the multi-parent graph w5, w3, w4, w2, and at the end of the merge operation, changes in v5, v3, and v4 are propagated to v2, and w6 becomes a child of w2 while remaining a child of w7. In 607, w5 has a multi-parent workspace w4 as a parent, so the root of w5's multi-parent graph is the nearest common ancestor of v4's parents, namely the LIVE workspace. w5's multi-parent graph is thus w5, w3, w4, w2, w6, LIVE, and at the end of the merge operation, changes in v5, v3, v4, v2, and v6 are propagated to v1 in LIVE, and w8, which is a descendant of LIVE both via w7 and workspaces in the multi-parent graph, becomes a child of w7 only.

When the merge operation removes a workspace from the workspace DAG, the workspace's versions are removed from the version hierarchy. Where there are one or more removed workspaces A(1 . . . n) between the root workspace and a workspace B that is not removed and is a descendant of the root workspace only by way of the removed workspaces A(1 . . . n), root workspace becomes a parent of the workspace B and versions in the root workspace that were ancestor versions of the current version in workspace B remain as ancestor versions.

Conclusion

The foregoing Detailed Description has disclosed to those skilled in the relevant technologies how to make and use a versioned relational database management system in which the workspaces that are used to access the versions maintained by the VRDBMS may have multiple parents. The Detailed Description has further disclosed the best mode presently known to the inventors of making their versioned relational database management system.

It will be immediately apparent to those skilled in the relevant technologies that the principles of the VRDBMS disclosed herein may be implemented in many different fashions. The preferred embodiment is implemented in the Oracle Workspace Manager, and many details of the preferred embodiment are a consequence of the fact that it is implemented in the environment provided by the Oracle Workspace Manager and the Oracle 9i relational database management system. One example of such a detail is the fact that the versions that are accessible via the workspaces are all implemented in version-enabled tables in the relational database system; in other embodiments, the versions may be implemented in other ways. Another is that the manner in which change propagates from one version to another is determined by the relationships of the workspaces to each other. Additionally, the implementation of the metadata in the preferred embodiment uses both metadata from the Oracle Workspace Manager and new metadata, and the specific form of the metadata is thus determined in part by the preexisting metadata for the Oracle Workspace Manager. Moreover, what is termed a workspace herein may be any arrangement which permits a user of the VRDBMS to access a particular version. How the versions, workspaces, or metadata are implemented in a particular embodiment is not essential to the invention; more important is the kinds of relationships between workspaces and versions specified by the metadata and how these relationships affect the operations that are performed on the workspaces and on the versions that are accessed via the workspaces.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A versioned relational database system, a processor and storage apparatus accessible to the processor being used to implement the versioned relational database system and the versioned relational database system comprising:
   a source of a plurality of versions of data;
   a plurality of workspaces, each workspace giving access to a version of the data; and
   metadata that specifies relationships among the workspaces such that a workspace is a node in a graph which permits workspace to have more than one parent workspace,
   wherein the processor performs operations on the versions of the data in the workspaces, the manner of performance of an operation being determined at least in part by the metadata.

2. The versioned relational database system set forth in claim 1 wherein:
   the operation further updates the metadata as required for the operation.

3. The versioned relational database system set forth in claim 2 wherein:
   the operations include an operation that makes a first existing workspace into a parent of a second existing workspace in the graph and updates the metadata accordingly.

4. The versioned relational database system set forth in claim 3 wherein:
   the operation that makes the first workspace into a parent of the second workspace makes the first workspace into an additional parent of the second workspace.

5. The versioned relational database system set forth in claim 2 wherein:
   the operations include an operation that removes a first workspace that is a parent of a second workspace in the graph as a parent of the second workspace and updates the metadata accordingly.

6. The versioned relational database system set forth in claim 1 wherein:
   the graph is a directed acyclic graph and
   for a workspace that is a multi-parent workspace, the directed acyclic graph is a multi-parent graph which includes as nodes the multi-parent workspace, all of the parents of the multi-parent workspace, and all workspaces that are ancestors of the parents of the multi-parent workspace in the directed acyclic graph up through the nearest common ancestor of all of the parents, the multi-parent workspace being a leaf node of the multi-parent graph, the parents and the parents' ancestors in the directed acyclic graph up to but not including the nearest common ancestor being intermediate nodes, and the nearest common ancestor being a root node.

7. The versioned relational database system set forth in claim 6 wherein:
   the processor performs operations on the versions of the data in the workspaces, the manner of performance of an operation being determined at least in part by the multi-parent graph.

8. The versioned relational database system set forth in claim 7 wherein:
   the operations include a change propagation operation that propagates changes to or from a version in a workspace of the multiparent graph, the change propagation operation using the multi-parent graph to determine workspaces whose versions are affected by the change propagation operation.

9. The versioned relational database system set forth in claim 8 wherein:
   the change propagation operation is a merge operation that propagates a change from a version in a non-root node of the multiparent graph to a version in the root node.

10. The versioned relational database system set forth in claim 9 wherein:
    the merge operation further removes all of the workspaces belonging to the multiparent graph except the workspace that is the root thereof from the versioned relational database system and updates the metadata accordingly.

11. The versioned relational database system set forth in claim 10 wherein:
    in removing the workspaces, the merge operation makes any workspace which does not belong to the multiparent graph but is a child of a workspace that is a leaf node or an intermediate node of the multiparent graph and is not also a descendant of the workspace that is the root of the multiparent graph via a workspace that does not belong to the multiparent graph into a child of the workspace that is the root node and updates the metadata accordingly.

12. The versioned relational database system set forth in claim 8 wherein:
    the non-root node is the leaf node.

13. The versioned relational database system set forth in claim 12 wherein:
    the merge operation further propagates a change in a version in an intermediate node to the version in the root node.

14. The versioned relational database system set forth in claim 13 wherein:
    the versions in the leaf node and the intermediate nodes from which changes are propagated are current versions, and the version in the root node to which the changes are propagated is the current version.

15. The versioned relational database system set forth in claim 8 wherein:
    the change propagation operation is a refresh operation that propagates a change in a version in a non-leaf node in the multi-parent graph to a version in the leaf node in the multi-parent graph.

16. The versioned relational database system set forth in claim 15 wherein:
    the refresh operation propagates the change from a version in the root node.

17. The versioned relational database system set forth in claim 16 wherein:
    the refresh operation further propagates a change from a version in an intermediate node to a version in the leaf node.

18. The versioned relational database system set forth in claim 17 wherein:
    the versions in the root node and the intermediate nodes from which changes are propagated are current versions and the version in the leaf node to which the changes are propagated is the current version.

19. The versioned relational database system set forth in claim 7 wherein:
an operation that operates on a workspace that belongs to a multi-parent graph or on a version in such a workspace and that may result in a constraint violation uses the multi-parent graph to determine whether the operation will violate the constraint.

20. The versioned relational database system set forth in claim 19 wherein:
the constraint is a primary key constraint, the primary key constraint being violated when the operation results in a split of a record in current versions in workspaces belonging to the multi-parent graph.

21. The versioned relational database system set forth in claim 19 wherein:
the constraint is a unique key constraint, the unique key constraint being violated when the operation results in a logical split of a record in current versions in the workspaces belonging to the multi-parent graph.

22. The versioned relational database system set forth in claim 19 wherein:
the constraint is a referential integrity constraint, the referential integrity constraint being violated when the operation results in a multi-parent graph such that a current version of a first table in a first workspace belonging to the multi-parent graph violates a referential integrity constraint with regard to a current version of a second table in a second workspace that belongs to the multi-parent graph and is a descendant of the first workspace.

23. Computer-readable storage apparatus, the storage apparatus being characterized in that:
the storage apparatus contains computer code which, when executed in a computer system, causes the computer system to implement a versioned relational database system, the versioned relational database system comprising
a source in the relational database system of one or more versions of data;
a plurality of workspaces, each workspace giving access to a version of the data; and
metadata that specifies relationships among the workspaces such that a workspace is a node in a graph which permits the workspace to have more than one parent workspace,
wherein the computer system performs operations on the versions of the data in the workspaces, the manner of performance of an operation being determined at least in part by the metadata.

24. A method employed in a versioned relational database system of performing a change propagation operation that propagates a change to or from a version of a table that is accessible via a workspace in the versioned relational database system, the change propagation operation being performed on a version in a given workspace that has more than one parent workspace, a processor and a storage device accessible to the processor being used to implement the versioned relational database system, and
the method comprising the steps performed in the processor of:
determining which workspaces in the versioned relational database system belong to a multi-parent graph that has a leaf workspace, two or more intermediate workspaces, and a root workspace, the given workspace being the leaf workspace;
using the multi-parent graph to determine workspaces in addition to the given workspace whose versions are affected by the change propagation operation; and
performing the change propagation operation on the version in the given workspace and on the additional workspaces whose versions are affected by the change propagation operation.

25. The method set forth in claim 24 wherein:
the change propagation operation propagates a change from a version in a non-root workspace of the multiparent graph to a version in the root workspace.

26. The method set forth in claim 25 wherein:
the change is propagated from a version in the leaf workspace to a version in the root workspace.

27. The method set forth in claim 26 wherein:
the change is propagated from a version in an intermediate workspace to a version in the root workspace.

28. The method set forth in claim 27 wherein:
the versions from and to which the changes are propagated are the current versions of their workspaces.

29. The method set forth in claim 25 further comprising the step of:
after the change has been propagated, removing the workspaces of the multi-parent graph other than the root workspace from the versioned relational database system.

30. The method set forth in claim 29 wherein the step of removing the workspaces comprises the step of:
making workspaces that do not belong to the multi-parent graph but are children of the workspaces that will be removed into children of the root workspace of the multi-parent graph.

31. The method set forth in claim 30 wherein:
a child of a workspace that will be removed that is a descendant of the root workspace via a workspace that will not be removed is not made into a child of the root workspace.

32. The method set forth in claim 24 wherein:
the change propagation operation propagates a change from a version in a root workspace of the multiparent graph to a version in a non-root workspace.

33. The method set forth in claim 32 wherein:
the change propagation operation propagates the change from a version in the root workspace to a version in the leaf workspace.

34. The method set forth in claim 33 wherein:
the change propagation operation propagates the change from a version in the root workspace to a version in an intermediate workspace.

35. The method set forth in claim 34 wherein:
the versions from and to which the changes are propagated are the current versions of their workspaces.

36. The method set forth in claim 24 further comprising the step of:
in propagating the changes, using the multi-parent graph to determine versions which must be checked for a constraint violation.

37. Computer-readable storage apparatus, the storage apparatus being characterized in that:
the storage apparatus contains computer code which, when executed in a computer system that has access thereto, causes the computer system to perform a method employed in a versioned relational database system of performing a change propagation operation that propagates a change to or from a version of a table that is accessible via a workspace in the versioned relational database system, the change propagation operation being performed on a version in a given workspace that has more than one parent workspace, and the method comprising the steps performed in the computer system of:

determining which workspaces in the versioned relational database system belong to a multi-parent graph that has a leaf workspace, two or more intermediate workspaces, and a root workspace, the given workspace being the leaf workspace;

using the multi-parent graph to determine workspaces in addition to the given workspace whose versions are affected by the change propagation operation; and performing the change propagation operation on the version in the given workspace and on the additional workspaces whose versions are affected by the change propagation operation.

38. A method of determining an extent of required constraint checking in a versioned relational database system wherein versions are accessed via workspaces and a given workspace is permitted to have more than one parent workspace, a processor and storage apparatus accessible to the processor being used to implement the versioned relational database system, the method being employed in connection with an operation that requires constraint checking and the method comprising the steps performed in the processor of:

determining whether a version that is affected by the operation is accessible via a workspace in the versioned relational database system that belongs to a multi-parent graph, the multi-parent graph having a leaf workspace, two or more intermediate workspaces, and a root workspace; and using the multi-parent graph to determine the extent of required constraint checking by determining versions which must be checked for a constraint violation.

39. The method set forth in claim 38 wherein:

the operation modifies the number of parents of a workspace to which the version belongs.

40. The method set forth in claim 39 wherein the method further comprises the step of:

determining whether a primary key constraint has been violated by checking the versions in the multi-parent graph resulting from the modification of the number of parents for a split of a record among the versions.

41. The method set forth in claim 39 wherein the method further comprises the step of:

determining whether a unique key constraint has been violated by checking the versions in the multi-parent graph resulting from the modification of the number of parents for a logical split of a record among the versions.

42. The method set forth in claim 39 wherein the method further comprises the step of:

determining whether a referential integrity constraint has been violated by checking the versions in the multi-parent graph resulting from the modification of the number of parents for a violation of a referential constraint among the versions.

43. The method set forth in claim 38 wherein:

the operation modifies a row in a version in a workspace that belongs to the multi-parent graph.

44. The method set forth in claim 43 wherein the method further comprises the step of:

determining whether a primary key constraint has been violated by checking the versions in the multi-parent graph for a split of a record among the versions.

45. The method set forth in claim 44 wherein the method further comprises the step of:

determining whether a unique key constraint has been violated by checking the versions in the multi-parent graph for a logical split of a record among the versions.

46. The method set forth in claim 45 wherein the method further comprises the step of:

determining whether a referential integrity constraint has been violated by checking the versions in the multi-parent graph for a violation of a referential constraint among the versions.

47. Storage apparatus that is characterized in that:

the storage apparatus contains computer code which, when executed in by a processor that has access to the storage apparatus, causes the processor to perform a method of determining an extent of required constraint checking in a versioned relational database system wherein versions are accessed via workspaces and a given workspace is permitted to have more than one parent workspace, the method being employed prior to performance of an operation that requires constraint checking and the method comprising the steps of:

determining whether a version that is affected by the operation is accessible via a workspace in the versioned relational database system that belongs to a multi-parent graph, the multi-parent graph having a leaf workspace, two or more intermediate workspaces, and a root workspace; and using the multi-parent graph to determine the extent of required constraint checking by determining versions which must be checked for a constraint violation.

48. A computer readable medium, the computer readable medium being characterized in that:

the computer readable medium contains program instructions for performing a change propagation operation in a versioned relational database system that propagates a change to or from a version of a table that is accessible via a workspace in the versioned relational database system, the change propagation operation being performed on a version in a given workspace that has more than one parent workspace, the program instructions being executable by a processor that has access to the computer readable medium, and the program instructions, when executed, causing the processor to perform the steps of:

determining which workspaces in the versioned relational database system belong to a multi-parent graph that has a leaf workspace, two or more intermediate workspaces, and a root workspace, the given workspace being the leaf workspace;

using the multi-parent graph to determine workspaces in addition to the given workspace whose versions are affected by the change propagation operation; and performing the change propagation operation on the version in the given workspace and on the additional workspaces whose versions are affected by the change propagation operation.

49. A computer readable medium, the computer readable medium being characterized in that:

the computer readable medium contains program instructions for determining an extent of required constraint checking in a versioned relational database system wherein versions are accessed via workspaces and a given workspace has more than one parent workspace, the determining being employed in connection with an operation that requires constraint checking, the program instructions being executable by a processor that has access to the computer readable medium, and the program instructions, when executed, causing the processor to perform the steps of:

determining whether a version that is affected by the operation is accessible via a workspace in the versioned relational database system that belongs to a multi-parent graph, the multi-parent graph having a leaf workspace, two or more intermediate workspaces, and a root workspace; and using the multi-parent graph to determine the extent of required constraint checking by determining versions which must be checked for a constraint violation.

* * * * *

UNITED STATES PATENT AND TRADEMARK OFFICE
CERTIFICATE OF CORRECTION

| | | |
|---|---|---|
| PATENT NO. | : 7,836,028 B1 | Page 1 of 1 |
| APPLICATION NO. | : 10/205084 | |
| DATED | : November 16, 2010 | |
| INVENTOR(S) | : Sanjay Agarwal et al. | |

It is certified that error appears in the above-identified patent and that said Letters Patent is hereby corrected as shown below:

In column 3, line 9, before "FIG." insert -- At 400, --.

In column 3, line 11, before "FIG. 5" insert -- at 500 --.

In column 3, line 26, after "Versions" insert -- : FIG. 2 --.

In column 6, line 63, delete "emp_table LT 501" and insert -- emp_table_LT 501 --, therefor.

In column 10, line 56, delete "multi parent" and insert -- multi-parent --, therefor.

In column 10, line 64, delete "410(0)}" and insert -- 410(0)}. --, therefor.

In column 10, line 65, delete "multi parent" and insert -- multi-parent --, therefor.

In column 12, line 10-11, delete "wm$mp leaf_workspace_table" and insert -- wm$mp_leaf_workspace_table --, therefor.

In column 16, line 25, before "referential" delete "1.".

In column 17, line 55, delete "mp_leaf workspace" and insert -- mp_leaf_workspace --, therefor.

In column 17, line 67, delete "transaction)" and insert -- transaction). --, therefor.

In column 21, line 21, in claim 1, after "permits" insert -- the --.

Signed and Sealed this
Second Day of August, 2011

David J. Kappos
*Director of the United States Patent and Trademark Office*